United States Patent [19]

Mitchell et al.

[11] 4,262,744
[45] Apr. 21, 1981

[54] MOLDED FITTINGS AND METHODS OF MANUFACTURE

[75] Inventors: Andrew Mitchell, Pompano Beach, Fla.; Kermit W. Janssen, Valley Forge, Pa.

[73] Assignee: Certain-teed Corporation, Valley Forge, Pa.

[21] Appl. No.: 103,932

[22] Filed: Dec. 14, 1979

Related U.S. Application Data

[63] Continuation-in-part of Ser. No. 31,522, Apr. 19, 1979.

[51] Int. Cl.³ .................. B01D 29/10; E03B 3/20; E21B 43/08
[52] U.S. Cl. .................. 166/227; 210/497.01; 264/154
[58] Field of Search ............ 166/234, 236, 227; 138/128, 155, 156, 157; 156/203; 210/460, 498, 497, 500 R; 55/498, 529; 264/159, 154, 156

[56] References Cited

U.S. PATENT DOCUMENTS

| | | | |
|---|---|---|---|
| 230,829 | 8/1880 | Shear et al. | 138/157 |
| 769,703 | 9/1904 | Lauridtzen | 138/157 |
| 1,025,186 | 5/1912 | Hill | 138/157 |
| 1,052,198 | 2/1913 | Wyre | 138/157 X |
| 1,647,907 | 11/1927 | Doty | 166/234 |
| 2,354,485 | 7/1944 | Slaughter | 138/128 X |
| 2,912,043 | 11/1959 | Bargholtz et al. | 156/203 X |
| 3,638,726 | 2/1972 | Sibley | 166/236 |
| 3,864,182 | 2/1975 | Shobert et al. | 166/233 X |
| 4,014,796 | 3/1977 | Sugiyama et al. | 55/498 X |
| 4,068,713 | 1/1978 | McGuire | 166/233 |

*Primary Examiner*—Stephen J. Novosad
*Attorney, Agent, or Firm*—John T. Synnestvedt

[57] ABSTRACT

A well screen and method for its manufacture are disclosed. The well screen is assembled from molded parts. The parts are initially formed with a continuous, imperforate outer skin. Continuous circumferential slots are cut in the skin to form a foraminous screen. Integrally formed annular ribs located between each slot provide crush resistance.

13 Claims, 11 Drawing Figures

MOLDED FITTINGS AND METHODS OF MANUFACTURE

RELATED APPLICATION

This application is a continuation-in-part of our co-pending prior application Ser. No. 31,522 filed Apr. 19, 1979.

FIELD OF THE INVENTION

This invention relates to devices for screening particulates from liquids, and methods for manufacturing such devices. The invention specifically concerns well screens.

BACKGROUND OF THE INVENTION

Although the invention is believed to have applicability for a wide variety of fluid handling systems, primary experience to date has been in the context of well screens. Therefore, the following description will be in that environment.

It is common practice to construct wells for water, oil, etc., by drilling or pounding a long passageway through the ground, into formations that bear the sought-for substance. A continuous casing or lining is then introduced into the well to provide a conduit for fluid and to prevent collapse of the well. One or more well screens are associated with the casing to enable the flow of fluid from the ground formation into the casing. The well screen also serves to block the flow of particulates, such as sand, into the well casing.

For many years, casing and well screens have been made of metal. Metal casings are subject to corrosion resulting from chemical and electrolytic attack that shorten the life of the casing. It is also believed that these factors render metal casings, even stainless steel parts such as well screens, less resistant to the development of colonies of bacteria that are sometimes present in water wells.

In order to overcome the foregoing disadvantages, casings of synthetic polymeric materials, for example, rigid polyvinyl chloride (PVC), have been used. Well screens made of such materials have likewise been used. Such prior plastic well screens have been formed from standard plastic pipe sections, for example, in which transverse slits are cut by circular saw blades that are urged against the outside surface of the pipe. These slits are straight-sided and can become clogged with sand particles that become wedged in the slits. Further, the slits must be discontinuous so as to form a plurality of longitudinally extending uncut portions that provide the axial strength of the unit.

One attempt to overcome these drawbacks is a well screen comprising a plastic keystone strip wound on an extruded core having raised sections, as shown in U.S. Pat. Nos. 3,378,420 and 4,068,713, or on a plurality of plastic support rods. These designs suffer the disadvantage that the keystone strip can become knocked loose from the support rods or core when the screen is lowered into the well or when the screen is cleaned, for example, by rotational jet cleaning that directs a high velocity jet of cleaning fluid outwardly from the interior of the screen. Also, some of these designs have shown a tendency to collapse longitudinally after a relatively short residence time in a well, resulting in almost complete failure of the screen. In addition, manufacturing costs are quite high.

SUMMARY OF THE INVENTION

It is an object of the invention to provide plastic well screens of rugged construction, that yield high flow rates per unit of length and that can be fabricated at low cost.

Well screens are formed of a plurality of molded sections. The sections include radial and longitudinal ribs covered by a thin exterior skin. The sections are designed so that they can be made in a simple two-part mold. Well screens having a variety of aperture sizes can be made without the need for different mold parts by cutting circumferential slits of predetermined width through the thin exterior skin.

DESCRIPTION OF THE PREFERRED EMBODIMENT

Figure 1:
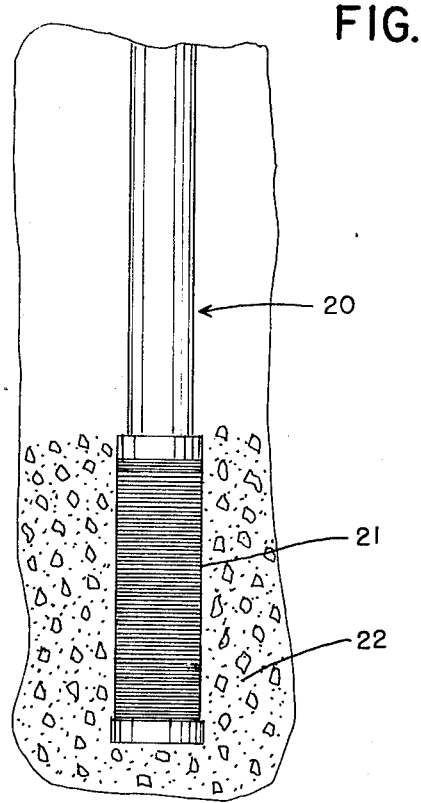
FIG. 1 shows, somewhat schematically, the bottom portion of a typical well structure with a well screen and an upwardly extending casing.

FIG. 1 illustrates, in somewhat schematic representation, the bottom portion of a typical well screen installation. The well casing comprises a string of pipe sections, such as section 20, that are made from a synthetic polymeric material, commonly rigid PVC. The casing 20 includes a well screen 21 disposed at the bottom of the casing for allowing water, or whatever other liquid is being drawn from the well, to enter the casing. The desirable characteristic of the well screen is that it permits the required flow of the liquid into the interior of the casing and yet it screens out a substantial portion of the particulates, such as sand, that are carried by the liquid. It is common practice to secure a well screen in place at the bottom of the well by forming a pack of gravel 22 around the well screen.

While the well screen is being shown in FIG. 1 at the bottom of the well, it should be realized that such well screens may also be included at intermediate positions in the casing, in those wells that pass through several water-bearing strata.

In the preferred arrangement, the well screen 21 is a hollow, tubular body made from two or more longitudinally extending body sections 24 (FIG. 2) that are joined together along lateral side edges 25 and 26 to form a completed hollow body. For screens to be used with smaller pipe diameters such as 4", 6" or 8", the screen can comprise two identical body sections that are joined together. For larger well screens to be used with 12', 14' and 16' pipe, it is believed desirable to form the screen of three identical sections such as the section 50 having a 120° transverse extent, shown in FIG. 11.

The material from which the sections 24 and 50 are formed is, preferably, a synthetic polymer. Rigid PVC is a preferred material because it is widely used for piping and because of its relatively low cost; however, other materials such as polyolefins, polyamides, polycarbonates, acetals, styrenes, and styrene copolymers are believed usable. If the polymer used is thermoplastic, these sections can be joined together by known techniques such as vibration welding, solvent welding and the like.

Figure 2:
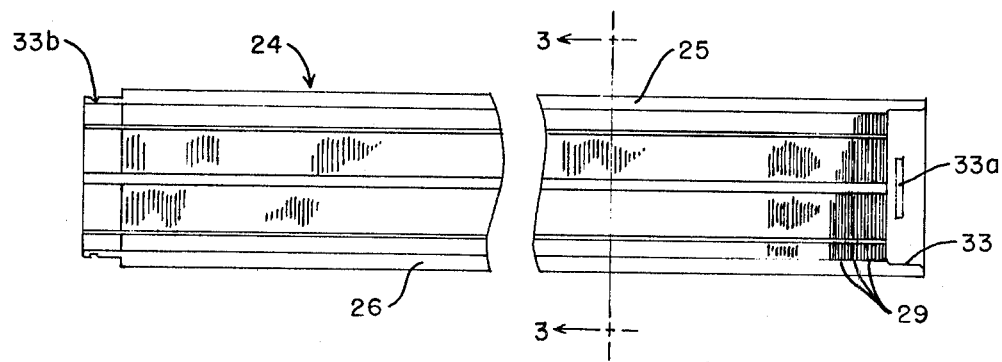
FIG. 2 is an elevational view of the interior of one section of a typical section of well screen made in accordance with the invention.
Figure 3:
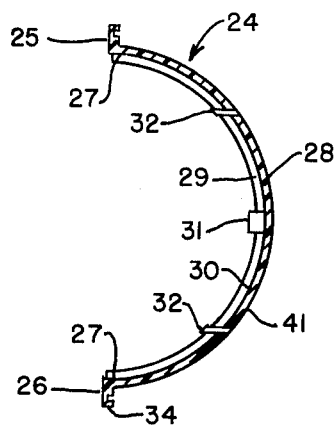
FIG. 3 is a cross-sectional view taken along line 3—3 of FIG. 2.

FIG. 2 is an elevation view of the interior side of the section 24. The section comprises the two previously noted lateral side surfaces 25 and 26 that serve as joining surfaces for securing the opposed sections together. Referring also to FIG. 3, the section 24 comprises a skin 28. The section also includes a plurality of inwardly extending compression ribs 29 that are formed integrally with the skin and that extend inwardly from the interior surface 30 of the skin. Preferably, the ribs 29 are parallel to each other and are in planes that are orthogonal to the longitudinal axis of the section 24, i.e., they extend radially inwardly. To impart longitudinal strength to each section 24 and to maintain the ribs 29 in a spaced relation, it is desirable to have at least one longitudinally extending rib 31 that is integrally formed with the skin 8 and that extends inwardly from the interior surface 30 of the skin. It may also be desirable to have auxiliary longitudinal ribs 32 that are also integrally formed with the skin 28 and that extend inwardly from the interior surface 30 of the skin. It is beneficial that the ribs 31 and 32 extend inwardly beyond the edges of the compression ribs 29 so that the longitudinal ribs prevent bodies, such as pumps, from coming into contact with the ribs 29. This lessens the likelihood of damage to the compression ribs 29.

It is also desirable to form the sections with means for securing the finished screen onto an adjoining pipe or well screen section. Thus, referring to FIG. 2, the section 24 may be provided with an entry portion 33 that may additionally include an upstanding locking tab 33a that is designed to lock with a groove, similar to the groove 33b, disposed on such adjoining section.

Referring to FIG. 3, if the sections 24 are to be joined by vibration welding, it is desirable to form the section 24 with a plurality of tabs 34, spaced longitudinally along the section, that enable the section 24 to be held firmly by the holding fixture of the vibration welding apparatus.

Figure 4:
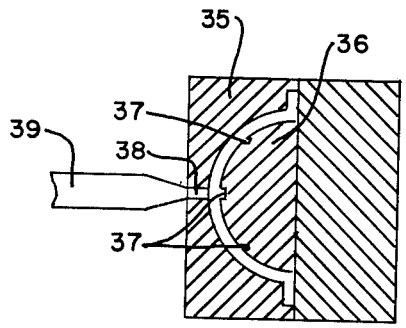
FIG. 4 is a schematic illustration of a preferred molding technique.

The section 24 can be made by a variety of molding or fabricating techniques; however, it is believed that the most effective process for forming section 24 is by injection molding, as shown schematically in FIG. 4. A mold space is formed between the female mold 35 and the male mold 36 to form the shape of the section 24. To define the longitudinal ribs 31 and 32, the male mold 36 is provided with a plurality of channels 37 that act as runners for the plastic material. The compression ribs 29 are formd between longitudinally spaced upstanding ridges (not shown) formed on the male mold member. The plastic material is injected under pressure into the mold space from the skin side of the section through the sprue 38 from the source of plasticized material 39. After the plastic material in the mold space has solidified, the mold parts 35 and 36 are separated and the finished piece is removed.

Figure 5:
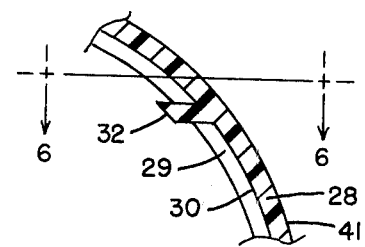
FIG. 5 is a fragmentary cross-sectional view of a section of a well screen section prior to forming openings in the section, taken along line 5—5 of FIG. 6.
Figure 6:
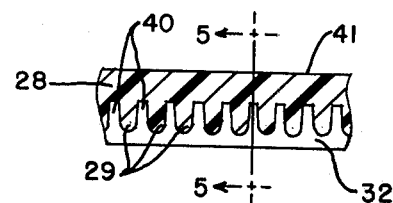
FIG. 6 is a cross-sectional view of the fragment of FIG. 5, taken along line 6—6.

It should be realized that by forming the section 24 in the manner shown in FIG. 4, a part having a continuous, nonforaminous skin 28 is produced, as illustrated in FIGS. 5 and 6. Thus, an intermediate part or unit, useful for making well screens, results. This intermediate unit includes the continuous skin 28, the spaced compression ribs 29 and longitudinal ribs 31 and 32 formed integrally with the skin 28. Referring particularly to FIG. 6, a plurality of annular spaces 40 are formed between adjacent ribs. At this point in the process, there is no path for fluid communication extending between the spaces 40 and the exterior surface 41 of the skin 28.

Figure 7:
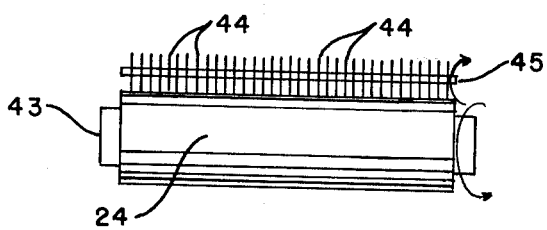
FIG. 7 is a schematic top view of equipment for cutting slits in the well screen sections.
Figure 8:
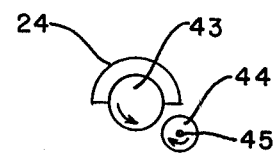
FIG. 8 is an end view of the equipment shown in FIG. 7.

FIGS. 7 and 8 illustrate a preferred procedure and apparatus for rendering the section 24 foraminous. The apparatus comprises a rotatably mounted mandrel 43 that includes means (not shown) for securely holding a section 24 that is placed on the mandrel. Adjacent the mandrel 43, a plurality of rotating circular saw blades 44 are mounted for common rotation on an arbor 45. Once the section 24 is securely mounted on the mandrel 23, the mandrel rotates in the direction of the arrow indicated, carrying the section 24 with the exterior surface 41 of the skin disposed outwardly, into engagement with the cutting edges of the saw blades 44.

Figure 9:
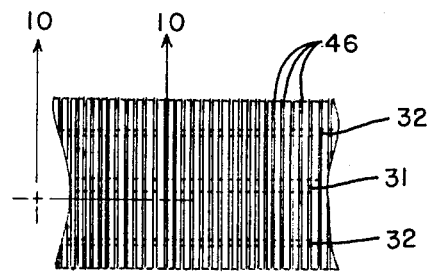
FIG. 9 is a view of the exterior of a segment of a well screen section.
Figure 10:
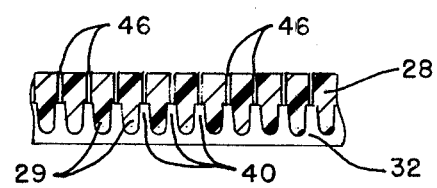
FIG. 10 is a cross-sectional view taken along line 10—10 of FIG. 9.

Referring to FIGS. 9 and 10, the preceding operation results in the formation of a plurality of parallel slots 46 that extend through the skin 28 and provide fluid communication from the spaces 40 to the exterior of the skin 28. The slots extend continuously from one edge of the section to the other.

It should be noted that well screens are commonly specified on the basis of the amount of area available for flow through the screen, which is a direct function of the width of the slots 46. By use of the method just described, for any given screen diameter, it is possible to produce a broad range of screens having differing flow characteristics by the use of a single set of mold parts. The intermediate units are all formed with the same set of mold parts and then the varying flow characteristics are obtained by employing saw blades 44 that cut slots 46 of different widths. Thus, the mold tool costs are minimized.

It should be further noted that the depth of cut of the blades 44 is maintained so that substantially only the skin 28 is cut, thereby leaving the longitudinal ribs 31 and 32 as the primary members imparting longitudinal strength to the section, along with the sections 27 (FIG. 3) that are adjacent the edges 25 and 26. The male mold member 36 is straight-sided in the regions 27 so that the skin 28 is somewhat thicker in these regions. Thus, when the saw blades 44 cut the slots 46 through the regions 27, they do not cut entirely through the skin and thus leave the material in the regions 27 that act as longitudinal ribs. This results in a structure that is very efficient from the standpoint of the amount of available flow area per unit length.

While the foregoing shows the cutting of an unassembled section 24, it is equally possible to assemble two of the sections 24 to form a cylindrical body which is thereafter subjected to a cutting operation such as that described above to form continuous parallel grooves through the skin 28.

Figure 11:
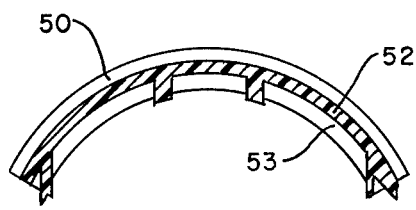
FIG. 11 is a cross-sectional view of another form of well screen section made in accordance with the invention.

Referring to FIG. 11, a section 50 of the type disclosed in the above-noted prior application can also be formed by the above-noted techniques. In this case, three identical sections 50 are joined to form the well screen. It should be noted that when the molded section 50 is released from the mold parts, there is a continuous skin or land section 52 that forms the outer surface of the section. The skin 52 is preferably relatively thin. In order to render the section foraminous, slits are cut through the skin 52 by saw blades that cut through the skin 52 in the regions between the transversely extending ribs 53. This cutting operation can take place before or after the three sections have been assembled and proceeds from the exterior of the skin 52 inwardly. Again, the advantage of this method is that a single set of mold parts, for a given diameter well screen, can serve to form screens having a wide variety of flow rates and filtering capabilities. These flow rates and filtering capabilities are determined by the width of the slits cut through the skin 52.

Well screens made from two parts, as shown in FIGS. 2 and 3, are used with relatively smaller diameter casings, such as 4", 6" and 8" casings. For these sizes, the skin 28 is approximately 0.075" and slot widths can range from about 0.01 to 0.04" in thickness. For the larger 10", 12" and 16" sizes, the three-part arrangement, as illustrated in FIG. 11, is believed desirable. In this case, skin thicknesses on the order of 0.100" and slot widths range from about 0.01" to about 0.09". Thus it can be seen that a wide range of flow characteristics can be accommodated in each size, with a minimum number of mold parts. An additional benefit of this construction is that the compression ribs 29 appear to act as I-beams and yield a substantial crush resistance. Well screens fabricated to date exhibit three times the crush resistance of the casings with which they are most commonly used.

We claim:

1. A well screen unit comprising a body having a continuous, substantially imperforate skin having an outer surface and an inner surface, a plurality of transverse, spaced compression ribs arranged to extend inwardly from the inner surface of the skin and being formed integrally with the skin, at least one longitudinally extending rib extending from the inner surface of the skin and being formed integrally with the skin, and means disposed at opposite lateral edges of the body defining joining surfaces for joining the body to another similar body.

2. A unit as in claim 1 wherein the compression ribs extend radially inwardly, running from one lateral edge to the opposite lateral edge of the skin, and are parallel with respect to each other and in planes that are orthogonal to the longitudinal axis of the unit, and each longitudinal rib extends parallel to the said longitudinal axis.

3. A unit as in claim 1 wherein the longitudinal rib extends beyond the transverse ribs.

4. A unit as in claim 1 wherein the body forms a portion of a tubular shape.

5. A unit as in claim 4 wherein the shape is cylindrical.

6. A well screen comprising a plurality of longitudinally extending molded sections joined together along lateral edges to form a tubular hollow screen body, each section comprising a skin, a plurality of spaced compression ribs extending inwardly from the skin toward the hollow interior of the screen body, each section having at least one longitudinal rib extending inwardly from the skin toward the hollow interior of the screen body, and a plurality of spaced slots formed in the skin and extending therethrough, the slots being disposed in portions of the skin located between adjacent compression ribs.

7. A well screen as in claim 6 wherein the compression ribs and longitudinal ribs are molded integrally with the skin.

8. A well screen as in claims 6 or 7 wherein the slots are substantially continuous about the body.

9. A well screen as in claims 6 or 7 wherein the hollow body is cylindrical, the compression ribs are arranged to extend radially inwardly and in parallel relationship with respect to each other, the longitudinal rib extending parallel to the axis of the cylindrical body.

10. A method of making a foraminous screen, comprising forming an intermediate unit having a skin with an exterior surface and an interior surface having a plurality of spaced compression ribs formed integrally with the skin and extending from said interior surface and at least one longitudinal rib formed integrally with the skin and extending from the interior surface of the skin, and forming a plurality of slots extending through the skin in regions located between adjacent compression ribs.

11. A method as in claim 10 and further comprising joining at least two of said units together to form a hollow body.

12. A method as in claim 11 wherein the slots are formed in the sections prior to joining the sections together.

13. A method as in claim 10 wherein the slots are formed by making continuous cuts in the skin of the section, the cuts extending between opposed lateral edges of the section.

* * * * *